(12) United States Patent
Hamel

(10) Patent No.: US 7,581,908 B1
(45) Date of Patent: Sep. 1, 2009

(54) CARGO SECURING SYSTEM

(76) Inventor: Jacques M. Hamel, 6330 Barrington Run, Alpharetta, GA (US) 30005

( * ) Notice: Subject to any disclaimer, the term of this patent is extended or adjusted under 35 U.S.C. 154(b) by 439 days.

(21) Appl. No.: 11/387,495

(22) Filed: Mar. 24, 2006

(51) Int. Cl.
*B60P 7/08* (2006.01)
(52) U.S. Cl. .............................. 410/94; 410/46; 410/121
(58) Field of Classification Search ...................... 410/1, 410/30, 46, 49, 69, 77, 79, 80, 82, 94, 95, 410/104, 121, 153; 296/37.6, 39.1, 39.2; 224/42.33, 42.34, 282, 403, 404, 552, 553; 248/349.1, 351
See application file for complete search history.

(56) References Cited

U.S. PATENT DOCUMENTS

| | | | |
|---|---|---|---|
| 4,770,579 A | | 9/1988 | Aksamit |
| 4,875,730 A | * | 10/1989 | Justice |
| 4,944,544 A | | 7/1990 | Dick |
| 5,520,316 A | | 5/1996 | Chen |
| 5,713,502 A | | 2/1998 | Dixon |
| 6,012,885 A | * | 1/2000 | Taylor et al. .................. 410/94 |
| 6,149,040 A | | 11/2000 | Walker |
| 2003/0111503 A1 | | 6/2003 | Miller |
| 2004/0050889 A1 | | 3/2004 | Shafer, Jr. et al. |

* cited by examiner

*Primary Examiner*—Stephen Gordon

(57) ABSTRACT

A cargo securing system for securing cargo in a cargo area of a vehicle from sliding in the cargo area includes a plate member configured to be positioned on a floor of the cargo area. A top surface of the plate member is configured to receive the cargo to support the cargo above the floor of the cargo area. A plurality of lateral securing assemblies are coupled to the plate member and configured to engage the cargo to inhibit sliding of the cargo on the plate member. At least one rotational securing assembly is coupled to the plate member and configured to engage the cargo to inhibit sliding of the cargo on the plate member.

20 Claims, 7 Drawing Sheets

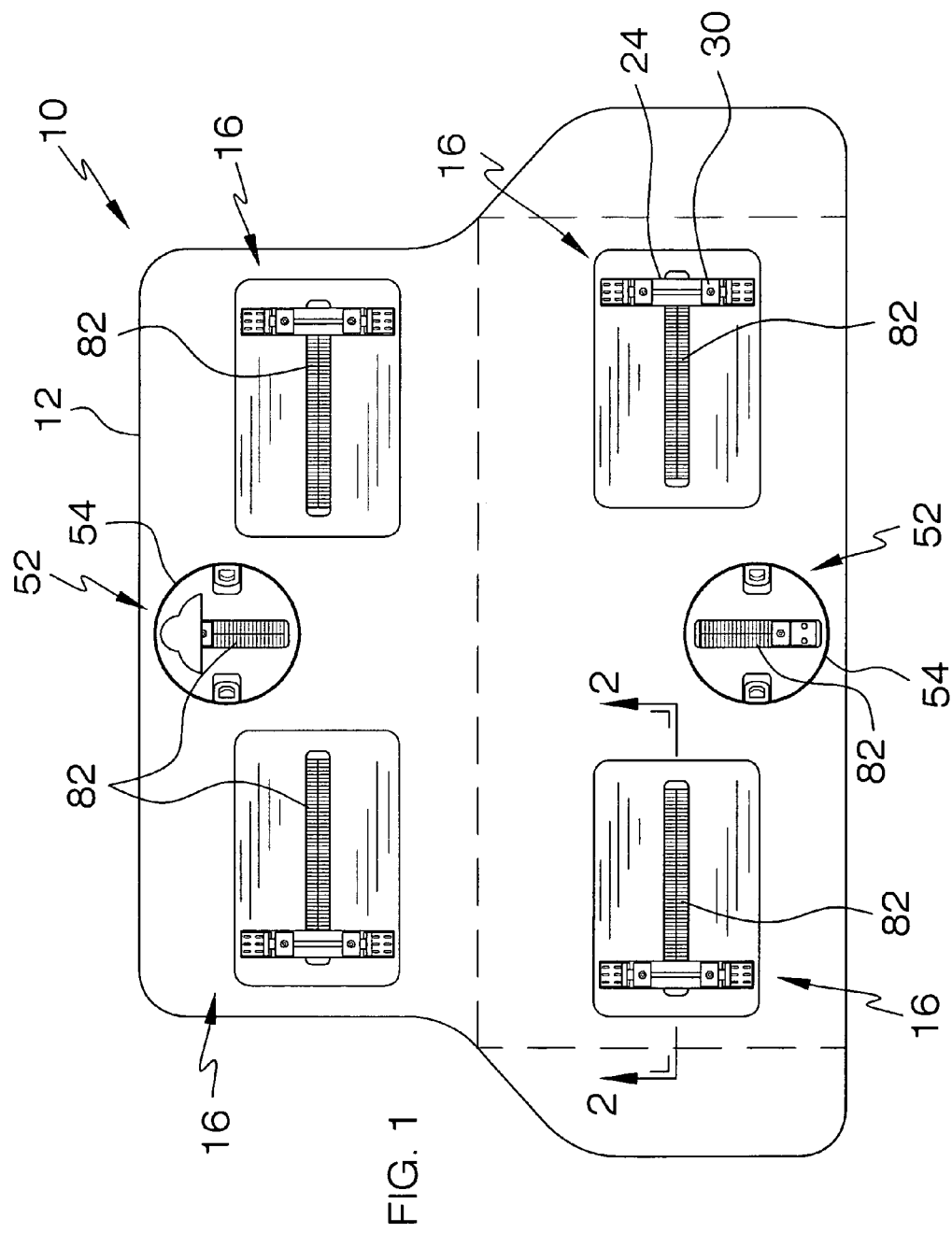

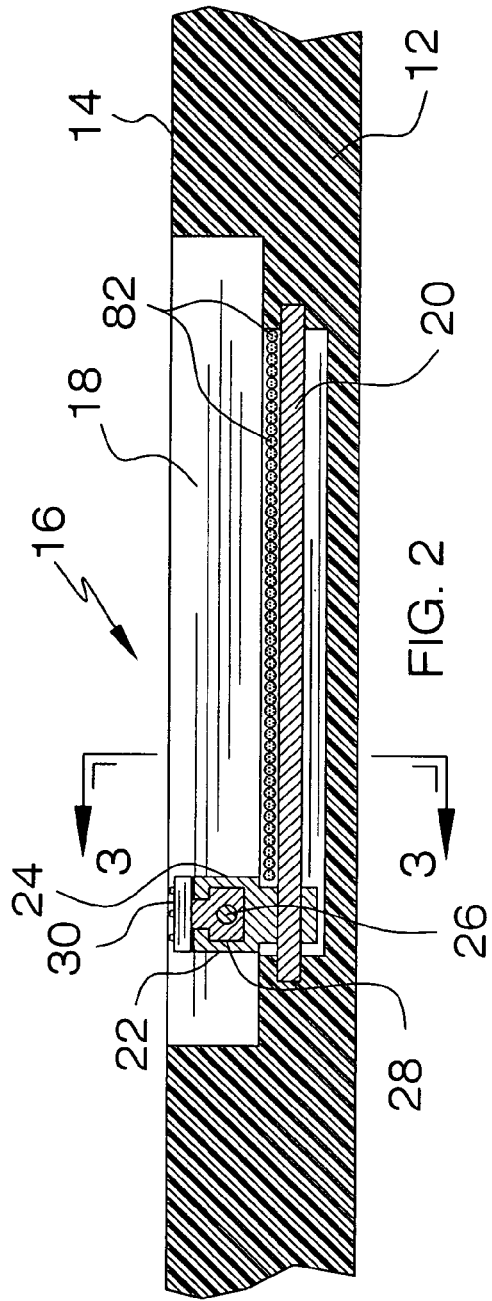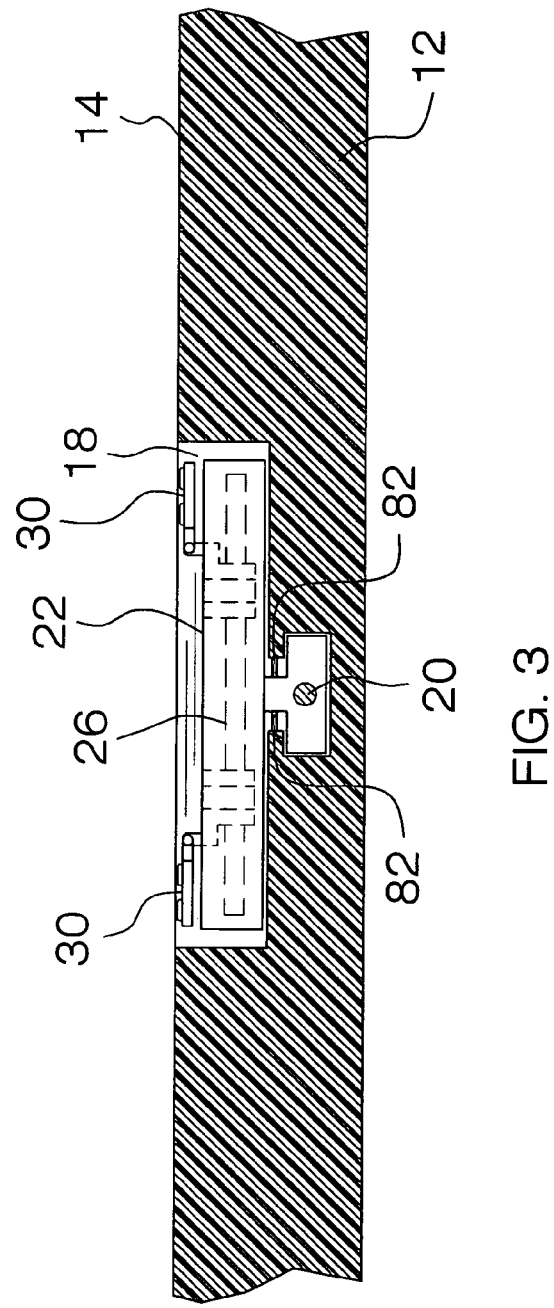

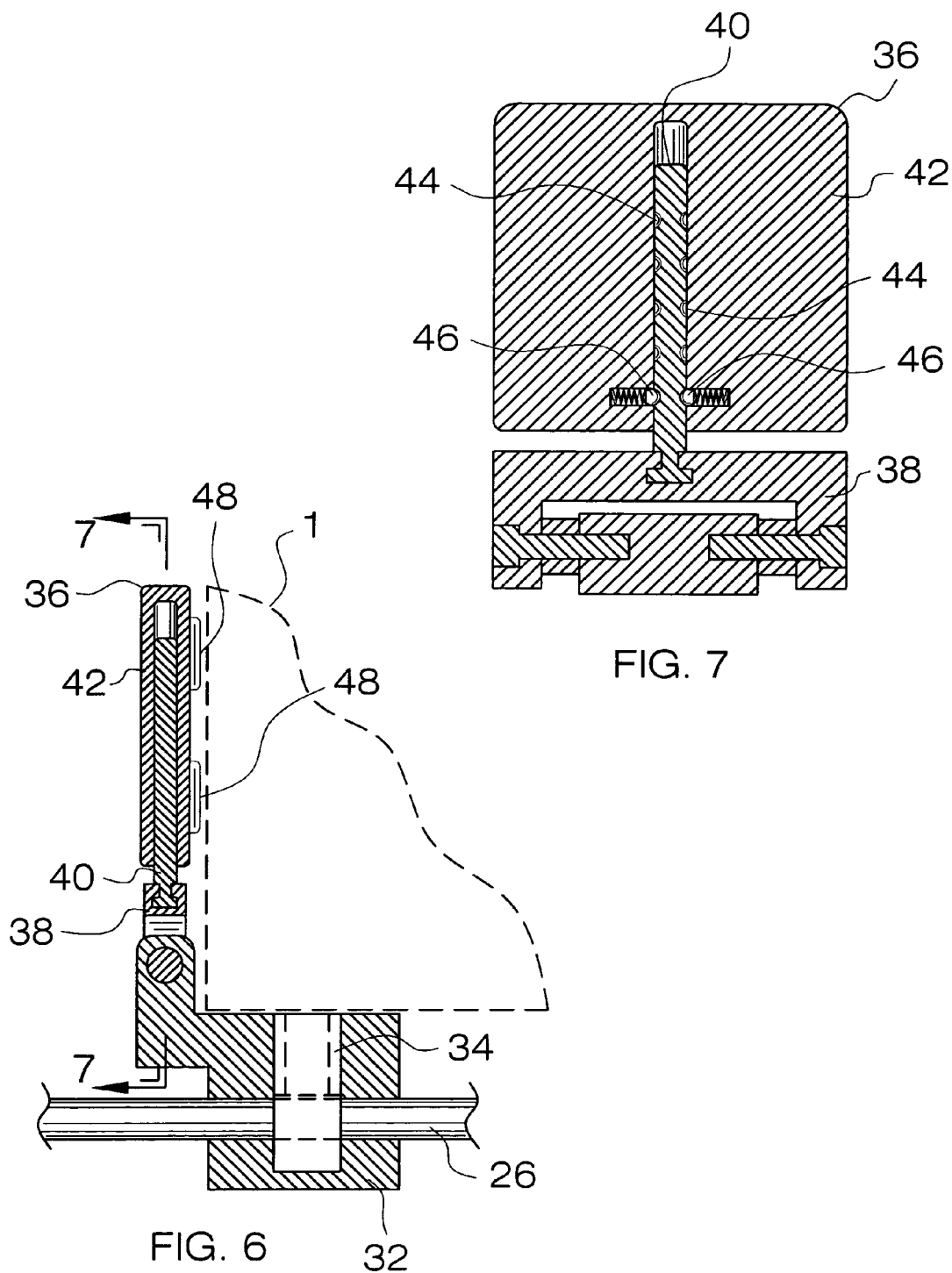

CARGO SECURING SYSTEM

BACKGROUND OF THE INVENTION

1. Field of the Invention

The present invention relates to trunk organizers and more particularly pertains to a new trunk organizer for securing cargo in a cargo area of a vehicle from sliding in the cargo area.

2. Description of the Prior Art

The use of trunk organizers is known in the prior art. U.S. Patent Application No. 2003/0111503 describes a system for compartmentalizing a trunk of a vehicle. Another type of trunk organizer is U.S. Pat. No. 5,520,316 for being positioned in the trunk of vehicle to secure cargo in the trunk of the vehicle.

While these devices fulfill their respective, particular objectives and requirements, the need remains for a system that includes certain improved features allowing for the securing features to be readily stored when not in use and to be quickly configured to accept cargo of different shapes and sizes.

SUMMARY OF THE INVENTION

The present invention meets the needs presented above by generally comprising a plate member configured to be positioned on a floor of the cargo area. A top surface of the plate member is configured to receive the cargo to support the cargo above the floor of the cargo area. A plurality of lateral securing assemblies are coupled to the plate member and configured to engage the cargo to inhibit sliding of the cargo on the plate member. At least one rotational securing assembly is coupled to the plate member and configured to engage the cargo to inhibit sliding of the cargo on the plate member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a cargo securing system according to the present invention.

FIG. 2 is a cross-sectional view of the present invention taken along line 2-2 of FIG. 1.

FIG. 3 is a cross-sectional view of the present invention taken along line 3-3 of FIG. 2.

FIG. 6 is a cross-sectional view of the present invention taken along line 6-6 of FIG. 5.

FIG. 7 is a cross-sectional view of the present invention taken along line 7-7 of FIG. 6.

DESCRIPTION OF THE PREFERRED EMBODIMENT

Figure 4:
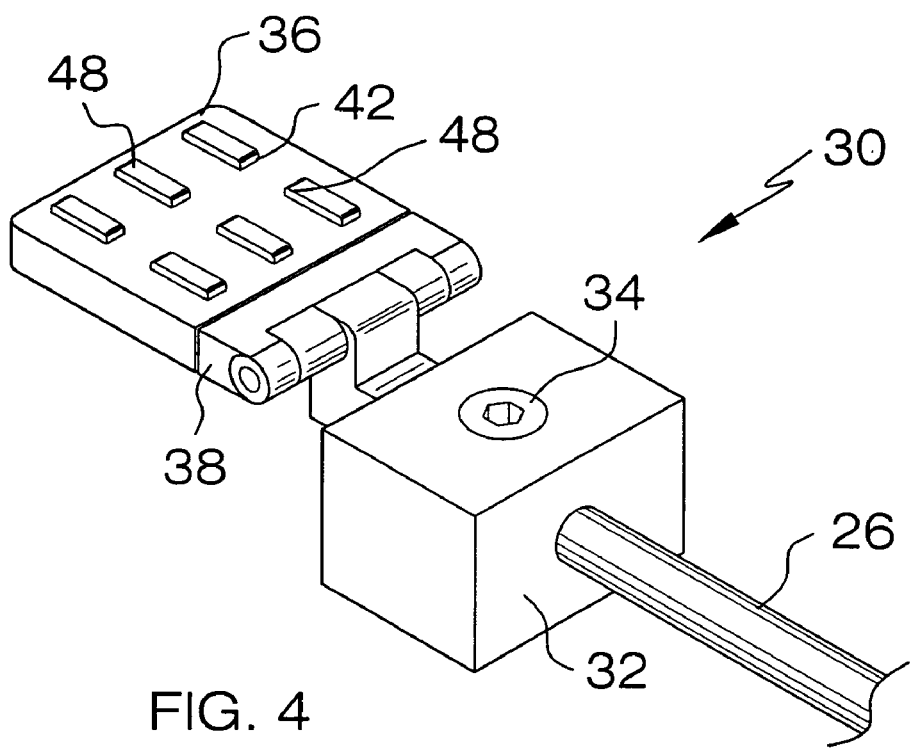
FIG. 4 is a perspective view of the at least one backstop of the present invention in the stored position.
Figure 5:
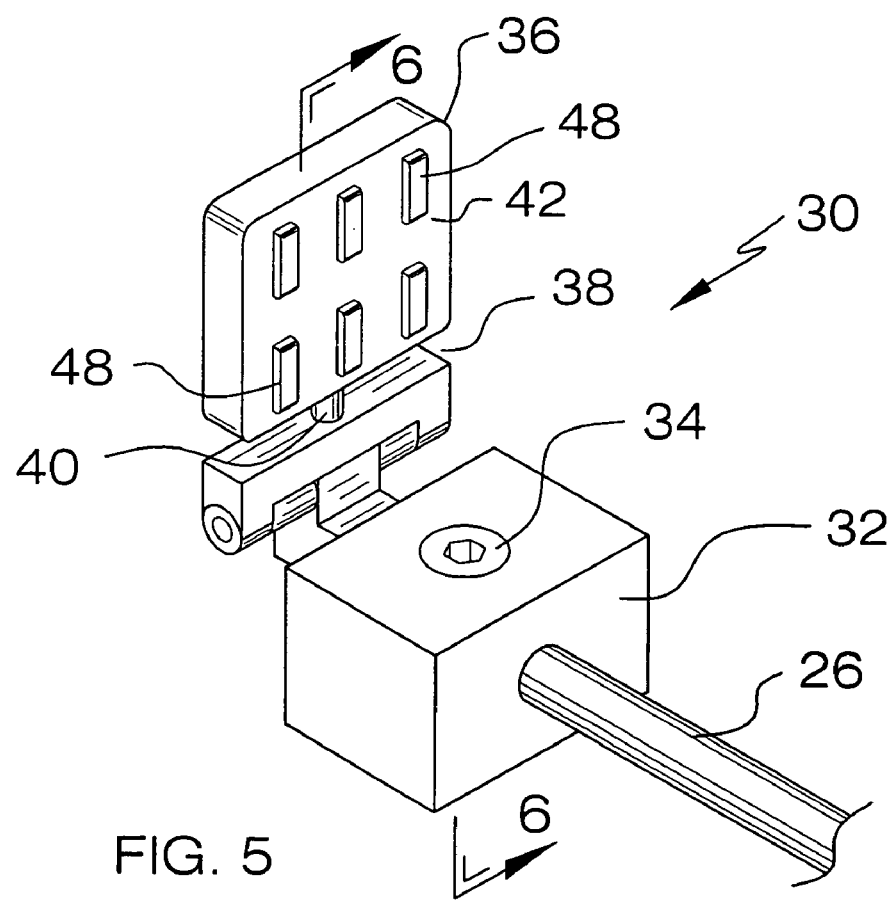
FIG. 5 is a perspective view of the at least one backstop of the present invention in the deployed position.
Figure 8:
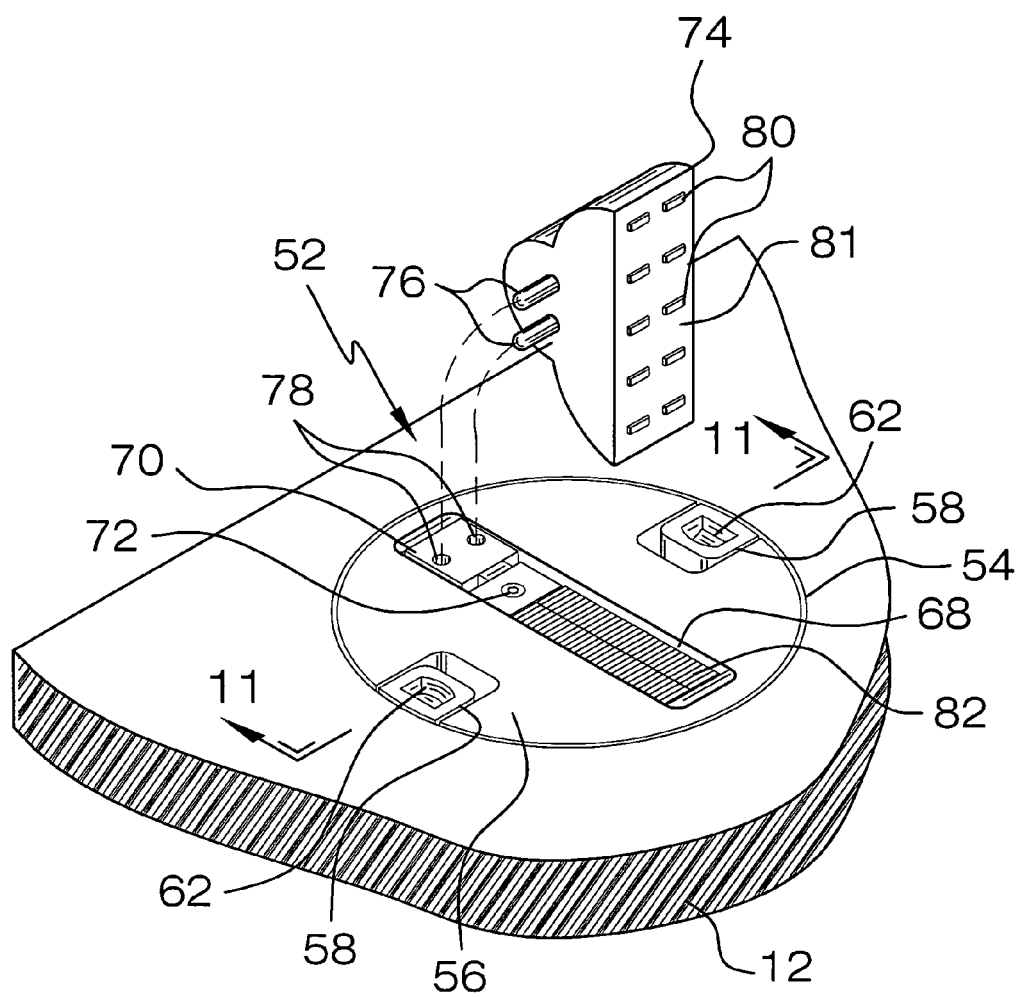
FIG. 8 is a perspective view of the at least one rotational securing assembly of the present invention.
Figure 9:
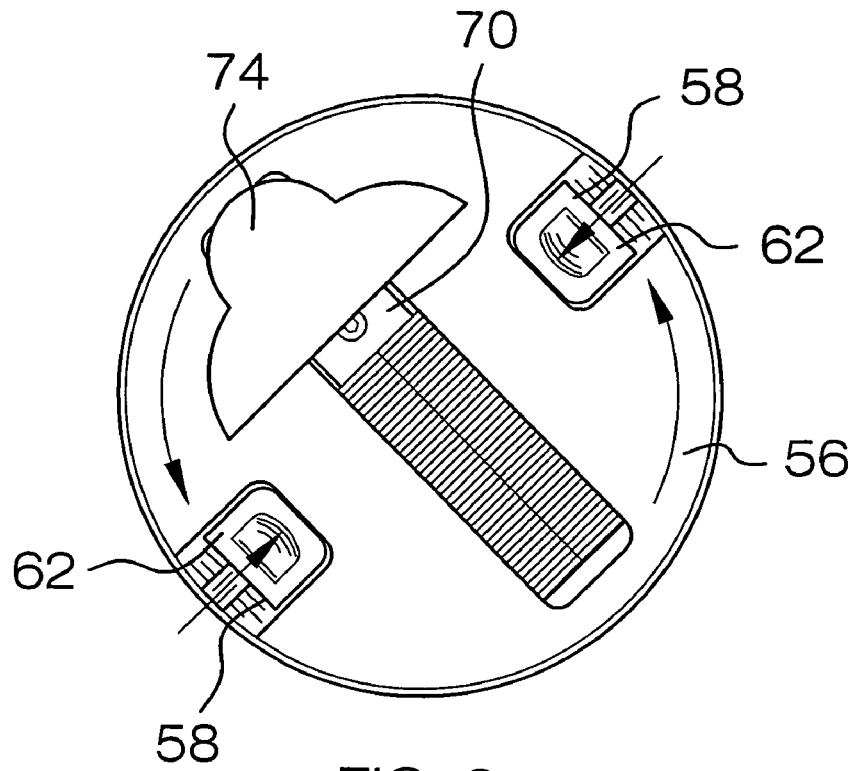
FIG. 9 is a top view of the at least one rotational securing assembly of the present invention.
Figure 10:
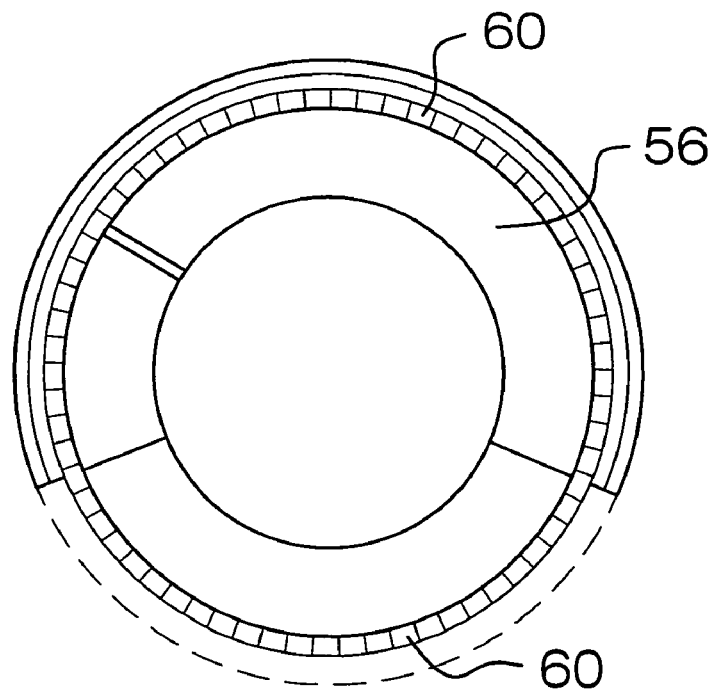
FIG. 10 is a bottom view of the at least one rotational securing assembly of the present invention.
Figure 11:
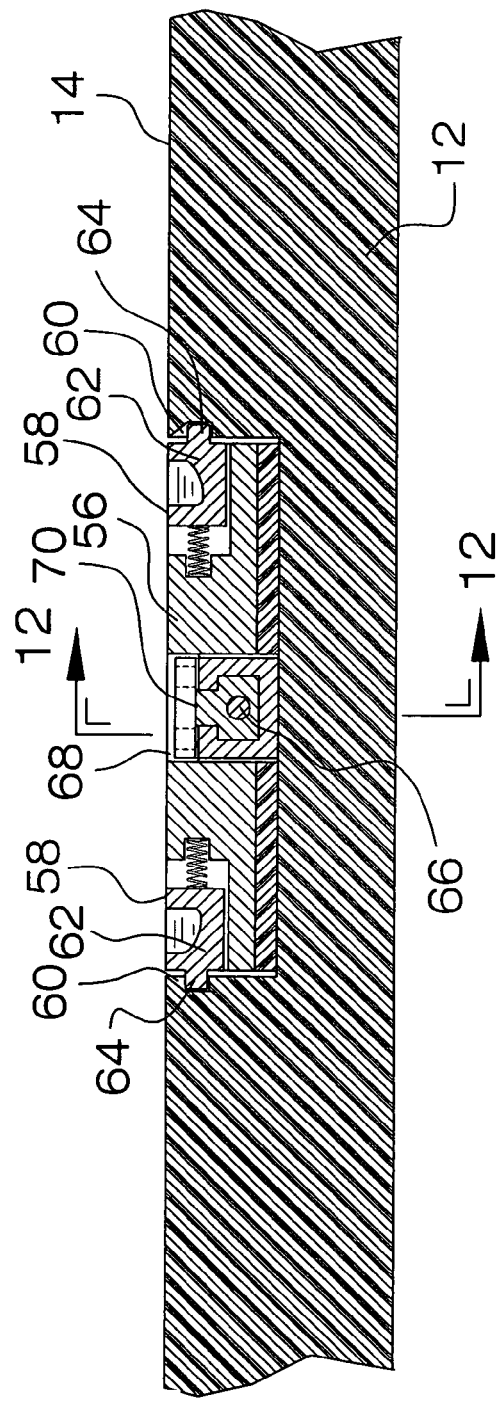
FIG. 11 is a cross-sectional view of the present invention taken along line 11-11 of FIG. 8.
Figure 12:
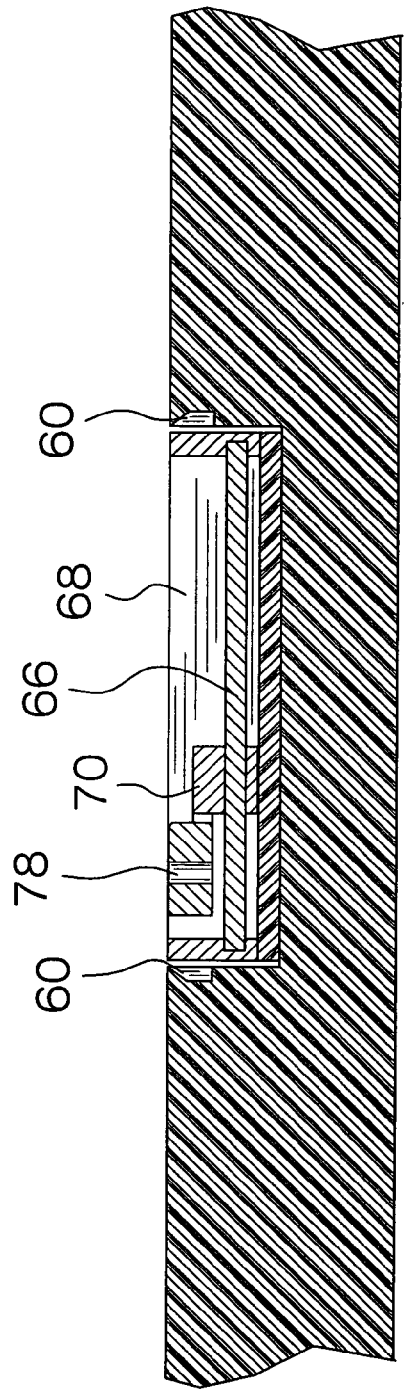
FIG. 12 is a cross-sectional view of the present invention taken along line 12-12 of FIG. 11.

With reference now to the drawings, and in particular to FIGS. 1 through 12 thereof, a new trunk organizer embodying the principles and concepts of the present invention and generally designated by the reference numeral 10 will be described.

As best illustrated in FIGS. 1 through 12, the cargo 1 securing system 10 generally comprises a plate member 12 being configured to be positioned on a floor of the cargo area. A top surface 14 of the plate member 12 is configured to receive cargo 1 and support the cargo 1 above the floor of the cargo area.

A plurality of lateral securing assemblies 16 are coupled to the plate member 12 and configured to engage the cargo 1 to inhibit sliding of the cargo 1 on the plate member 12. Each of the lateral securing assemblies 16 is positioned in one of a plurality of lateral channels 18 of the plate member 12. Each of the lateral securing assemblies 16 is positionable along a length of the associated one of the lateral channels 18 of the plate member 12. Each of the lateral securing assemblies 16 comprises a lateral rod 20 coupled to the plate member 12 and extending along a length of the associated one of the lateral channels 18.

An anchoring member 22 of each of the lateral securing assemblies 16 is slidably coupled to the lateral rod 20 to permit the anchoring member 22 to slide along a portion of a length of the lateral rod 20. The anchoring member 22 is configured to engage the cargo 1 to secure the cargo 1 from sliding along the top surface 14 of the plate member 12. The anchoring member 22 comprises an elongated housing 24 being positioned substantially transverse to the lateral rod 20. The elongated housing 24 slidably receives the lateral rod 20 to permit sliding of the elongated housing 24 along the lateral rod 20. A transverse rod 26 of the anchoring member 22 is positioned in a groove 28 of the housing and is substantially transverse to the lateral rod 20. At least one securing portion 30 of the anchoring member 22 slidably receives the transverse rod 26 to permit the at least one securing portion 30 to slide along a portion of a length of the transverse rod 26 to engage the cargo 1. The at least one securing portion 30 includes a positioning block 32 slidably receiving the transverse rod 26 to permit sliding of the at least one securing portion 30 along the portion of the length of the transverse rod 26. A locking member 34 of the at least one securing portion 30 threadably extends into the positioning block 32 to selectively frictionally engage the transverse rod 26 to inhibit movement of the positioning block 32 along the transverse rod 26.

The at least one securing portion 30 includes a backstop 36 pivotally coupled to the positioning block 32 to permit the backstop 36 to pivot between a stored position and a deployed position. The backstop 36 is configured to abut the cargo 1 to inhibit sliding of the cargo 1 when the backstop 36 is in the deployed position. The stored position is defined by the backstop 36 being positioned substantially parallel to the top surface 14 of the plate member 12. The deployed position is defined by the backstop 36 being positioned substantially perpendicular to the top surface 14 of the plate member 12. The backstop 36 includes a base portion 38 pivotally coupled to the positioning block 32. A stanchion portion 40 of the backstop 36 is coupled to the base portion 38. The stanchion portion 40 is positioned opposite the positioning block 32 and extends substantially perpendicularly away from the base portion 38.

The backstop 36 includes a tab portion 42 slidably coupled to the stanchion portion 40 permitting a distance between the tab portion 42 and the base portion 38 to be selectively adjustable. A plurality of notches 44 extends along a portion of a length of the stanchion portion 40. At least one indexing portion 46 of the backstop 36 is positioned in the tab portion 42. The at least one indexing portion 46 is biased into one of the notches 44 to permit the tab portion 42 to be indexed at predetermined positions along the stanchion portion 40. A plurality of cushion members 48 are coupled to a face of the tab portion 42 to inhibit the tab portion 42 from marring the cargo 1 when the tab portion 42 engages the cargo 1. Each of the lateral securing assemblies 16 may include a cover member, not shown, that is selectively inserted into the associated one of the channels to cover the associated one of said lateral securing assemblies 16 and inhibit debris from entering the channels of the late member when the associated one of the lateral securing assemblies 16 is not being used.

At least one rotational securing assembly 52 is coupled to the plate member 12 and configured to engage the cargo 1 to inhibit sliding of the cargo 1 on the plate member 12. The at least one rotational securing assembly 52 is rotatably positioned in at least one annular depression 54 of the plate member 12 to permit the at least one rotational member to be rotated to engage the cargo 1. The at least one rotational securing assembly 52 includes a base plate 56 rotatably positioned in the annular depression 54 to permit rotation of the at least one rotational securing assembly 52. At least one indexing member 58 of the at least one rotational securing assembly 52 selectively engages one of a plurality of indexing sockets 60 extending into the plate member 12 from the annular depression 54 to secure the at least one rotational securing assembly 52 in a desired position. The at least one indexing member 58 includes a retraction portion 62 slidably coupled to the base plate 56. The retraction portion 62 is configured to be engage by a hand of a user to slide the at least one indexing member 58 away from the indexing sockets 60 to permit rotation of the base plate 56. The retraction portion 62 is biased outwardly from the base plate 56 to permit the at least one indexing portion 58 to engage one of the indexing sockets 60 and secure the base plate 56 when the retraction portion 62 is released by the user.

An indexing pin 64 of the at least one indexing member 58 is coupled to the retraction portion 62 and extends away from the base plate 56 to extend into one of the indexing sockets 60 and inhibit rotation of the base plate 56 when the retraction portion 62 is biased outwardly from the base plate 56. A positioning rod 66 of the at least one rotational securing assembly 52 is positioned in a slot 68 of the base plate 56 and extending along a portion of a diameter of the base plate 56. The at least one rotational securing assembly 52 includes a transitional member 70 slidably coupled to the positioning rod 66 to permit the transitional member 70 to be selectively positioned along a portion of a length of the positioning rod 66. A securing member 72 threadably extends into the transitional member 70 and selectively engages the positioning rod 66 to frictionally secure the transitional member 70 in a desired position along the positioning rod 66. The at least one rotational securing assembly 52 includes an anchor block 74 being selectively secured to the transitional member 70 to engage the cargo 1 and inhibit sliding of the cargo 1 on the plate member 12.

A plurality of alignment pins 76 extend outwardly from the anchor block 74 and are selectively inserted in to a plurality of apertures 78 in the transition member to secure the anchor block 74 to the transitional member 70. A plurality of buffer members 80 are coupled to a planar vertical surface 81 of the anchor block 74 to inhibit the anchor block 74 from inadvertently marring the cargo 1 when the anchor block 74 engages the cargo 1. A plurality of bristles 82 are positioned in the channels of the plate member 12 and the slot 68 of the at least one rotational securing assembly 52 to inhibit debris from entering the associated one of the channels of the plate member 12 or the slot 68 of the at least one rotational securing assembly 52.

In use, the plate member 12 is positioned in the cargo area of the vehicle. The tab portion 42 of the lateral securing assemblies 16 and the anchor block 74 of the at least one rotational securing assembly 52 are positioned to about the cargo 1 and inhibit sliding of the cargo 1 along the plate member 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cargo securing system for securing cargo positioned in a cargo area of a vehicle, said cargo securing system comprising:

a plate member being configured to be positioned on a floor of the cargo area, a top surface of said plate member being configured to receive the cargo to support the cargo above the floor of the cargo area;

a plurality of lateral securing assemblies being coupled to said plate member and configured to engage the cargo to inhibit sliding of the cargo on said plate member;

at least one rotational securing assembly being coupled to said plate member and configured to engage the cargo to inhibit sliding of the cargo on said plate member;

each of said lateral securing assemblies being positioned in one of a plurality of lateral channels of said plate member, each of said lateral securing assemblies being positionable along a length of the associated one of said lateral channels of said plate member;

each of said lateral securing assemblies including a lateral rod being coupled to said plate member and extending along a length of the associated one of said lateral channels, an anchoring member of each of said lateral securing assemblies being slidably coupled to said lateral rod to permit said anchoring member to slide along a portion of a length of said lateral rod, said anchoring member being configured to engage the cargo to secure the cargo from sliding along said top surface of said plate member; and said anchoring member comprising an elongated housing being positioned substantially transverse to said lateral rod, said elongated housing slidably receiving said lateral rod to permit sliding of said elongated housing along said lateral rod.

2. The cargo securing system as set forth in claim 1, wherein said anchoring member further includes a transverse rod positioned in a groove of said housing, said traverse rod being orientated substantially transverse to said lateral rod, said anchoring member including at least one securing portion slidably receiving said transverse rod to permit said at least one securing portion to slide along a portion of a length of said transverse rod to engage the cargo, said securing portion including a positioning block slidably receiving said transverse rod to permit sliding of said at least one securing portion along the portion of the length of said transverse rod.

3. The cargo securing system as set forth in claim 2, wherein said anchoring member further includes a locking member threadably extending into said positioning block to selectively frictionally engage said transverse rod to inhibit movement of said positioning block along said transverse rod.

4. The cargo securing system as set forth in claim 3, wherein said anchoring member further includes a backstop pivotally coupled to said positioning block to permit said backstop pivot between a stored position and a deployed position, said backstop being configured to abut the cargo to inhibit sliding of the cargo when said backstop is in said deployed position, said stored position of said backstop being defined by said backstop being positioned substantially parallel to said top surface of said plate member, said deployed position being defined by said backstop being positioned substantially perpendicular to said top surface of said plate member.

5. The cargo securing system as set forth in claim 2, wherein said anchoring member further includes a backstop pivotally coupled to said positioning block to permit said backstop to pivot between a stored position and a deployed position, said backstop being configured to abut the cargo to inhibit sliding of the cargo when said backstop is in said deployed position, said stored position of said backstop being defined by said backstop being positioned substantially parallel to said top surface of said plate member, said deployed position being defined by said backstop being positioned substantially perpendicular to said top surface of said plate member.

6. The cargo securing system as set forth in claim 4, wherein said backstop includes a base portion pivotally coupled to said positioning block, a stanchion portion of said backstop being coupled to said base portion, said stanchion portion being positioned opposite said positioning block and extending substantially perpendicularly to said base portion, said backstop including a tab portion slidably coupled to said stanchion portion permitting a distance between said tab portion and said base portion to be selectively adjustable.

7. The cargo securing system as set forth in claim 6, wherein said stanchion portion includes a plurality of notches extending along a portion of a length of said stanchion portion, at least one indexing portion of said backstop being positioned in said tab portion, said at least one indexing portion being biased into one of said notches to permit said tab portion to be indexed at predetermined positions along said stanchion portion.

8. The cargo securing system as set forth in claim 6, wherein said anchoring member includes a plurality of cushion members being coupled to a face of said tab portion to inhibit said tab portion from marring the cargo when said tab portion engages the cargo.

9. The cargo securing system as set forth in claim 1, wherein said at least one rotational securing assembly is rotatably positioned in at least one annular depression of said plate member, said at least one rotational securing assembly including a base plate being rotatably positioned in said annular depression.

10. The cargo securing system as set forth in claim 9, further including at least one indexing member selectively engaging one of a plurality of indexing sockets extending into said plate member from said annular depression to secure said at least one rotational securing assembly in a desired position.

11. The cargo securing system as set forth in claim 9, wherein said at least one rotational securing assembly includes a positioning rod being positioned in a slot of said base plate and extending along a portion of a diameter of said base plate, a transitional member being slidably coupled to said positioning rod to permit said transitional member to be selectively positioned along a portion of a length of said positioning rod, said at least one rotational securing assembly including an anchor block being selectively secured to said transitional member to engage the cargo and inhibit sliding of the cargo on said plate member.

12. A cargo securing system for securing cargo positioned in a cargo area of a vehicle, said cargo securing system comprising:

a plate member being configured to be positioned on a floor of the cargo area, a top surface of said plate member being configured to receive the cargo to support the cargo above the floor of the cargo area;

a plurality of lateral securing assemblies being coupled to said plate member and configured to engage the cargo to inhibit sliding of the cargo on said plate member; and at least one rotational securing assembly being coupled to said plate member and configured to engage the cargo to inhibit sliding of the cargo on said plate member, said at least one rotational securing assembly is rotatably positioned in at least one annular depression of said plate member, said at least one rotational securing assembly including a base plate being rotatably positioned in said annular depression; and at least one indexing member selectively engaging one of a plurality of indexing sockets extending into said plate member from said annular depression to secure said at least one rotational securing assembly in a desired position.

13. The cargo securing system as set forth in claim 12, wherein each of said lateral securing assemblies is positioned in one of a plurality of lateral channels of said plate member, each of said lateral securing assemblies being positionable along a length of the associated one of said lateral channels of said plate member.

14. The cargo securing system as set forth in claim 13, wherein each of said lateral securing assemblies includes a lateral rod being coupled to said plate member and extending along a length of the associated one of said lateral channels, an anchoring member of each of said lateral securing assemblies being slidably coupled to said lateral rod to permit said anchoring member to slide along a portion of a length of said lateral rod, said anchoring member being configured to engage the cargo to secure the cargo from sliding along said top surface of said plate member.

15. The cargo securing system as set forth in claim 14, wherein said anchoring member comprises an elongated housing being positioned substantially transverse to said lateral rod, said elongated housing slidably receiving said lateral rod to permit sliding of said elongated housing along said lateral rod.

16. The cargo securing system as set forth in claim 15, wherein said anchoring member further includes a transverse rod positioned in a groove of said housing, said traverse rod being orientated substantially transverse to said lateral rod, said anchoring member including at least one securing portion slidably receiving said transverse rod to permit said at least one securing portion to slide along a portion of a length of said transverse rod to engage the cargo, said securing portion including a positioning block slidably receiving said transverse rod to permit sliding of said at least one securing portion along the portion of the length of said transverse rod.

17. The cargo securing system as set forth in claim 16, wherein said anchoring member further includes a locking member threadably extending into said positioning block to selectively frictionally engage said transverse rod to inhibit movement of said positioning block along said transverse rod.

18. The cargo securing system as set forth in claim 17, wherein said anchoring member further includes a backstop pivotally coupled to said positioning block to permit said backstop to pivot between a stored position and a deployed position, said backstop being configured to abut the cargo to inhibit sliding of the cargo when said backstop is in said deployed position, said stored position of said backstop being defined by said backstop being positioned substantially parallel to said top surface of said plate member, said deployed position being defined by said backstop being positioned substantially perpendicular to said top surface of said plate member.

19. The cargo securing system as set forth in claim 16, wherein said anchoring member further includes a backstop pivotally coupled to said positioning block to permit said backstop to pivot between a stored position and a deployed position, said backstop being configured to abut the cargo to inhibit sliding of the cargo when said backstop is in said deployed position, said stored position of said backstop being defined by said backstop being positioned substantially parallel to said top surface of said plate member, said deployed position being defined by said backstop being positioned substantially perpendicular to said top surface of said plate member.

20. The cargo securing system as set forth in claim 18, wherein said backstop includes a base portion pivotally coupled to said positioning block, a stanchion portion of said backstop being coupled to said base portion, said stanchion portion being positioned opposite said positioning block and extending substantially perpendicularly to said base portion, said backstop including a tab portion slidably coupled to said stanchion portion permitting a distance between said tab portion and said base portion to be selectively adjustable.

\* \* \* \* \*